(12) United States Patent
Vicintin et al.

(10) Patent No.: US 10,450,510 B2
(45) Date of Patent: Oct. 22, 2019

(54) INDUSTRIAL PROCESS USING A FORCED-EXHAUST METAL FURNACE AND MECHANISMS DEVELOPED FOR SIMULTANEOUSLY PRODUCING COAL, FUEL GAS, PYROLIGNEOUS EXTRACT AND TAR

(71) Applicant: BOCAIUVA MECANICA LTDA., Bocaiuva, MG (BR)

(72) Inventors: Ricardo Antônio Vicintin, Belo Horizonte (BR); Adriana De Oliveira Vilela, Belo Horizonte (BR); José Urbano Alves, Pirapora (BR); Thalis Pacceli Da Silva E Souza, Belo Horizonte (BR)

(73) Assignee: BOCAIUVA MECANICA LTDA., Bocaiuva, MG (BR)

( * ) Notice: Subject to any disclaimer, the term of this patent is extended or adjusted under 35 U.S.C. 154(b) by 70 days.

(21) Appl. No.: 15/309,910

(22) PCT Filed: May 7, 2015

(86) PCT No.: PCT/BR2015/000063
§ 371 (c)(1),
(2) Date: Nov. 9, 2016

(87) PCT Pub. No.: WO2015/168763
PCT Pub. Date: Nov. 12, 2015

(65) Prior Publication Data
US 2017/0218275 A1    Aug. 3, 2017

(30) Foreign Application Priority Data
May 9, 2014  (BR) .............................. 102014011171

(51) Int. Cl.
*C10B 25/04*       (2006.01)
*C10B 27/02*       (2006.01)
(Continued)

(52) U.S. Cl.
CPC ................. *C10B 27/02* (2013.01); *C10B 1/04* (2013.01); *C10B 3/00* (2013.01); *C10B 7/06* (2013.01);
(Continued)

(58) Field of Classification Search
CPC ......... F01K 11/02; C10B 25/04; C10B 27/02; C10B 53/02; C10B 3/00; C10B 49/02;
(Continued)

(56) References Cited

U.S. PATENT DOCUMENTS

| 2,224,823 A | * | 12/1940 | Klein | ........................ C10B 1/04 201/15 |
| 3,962,045 A | * | 6/1976 | Douglas | .................... C10B 1/04 202/117 |

(Continued)

FOREIGN PATENT DOCUMENTS

| BR | 8205813 A | 8/1984 |
| BR | PI0104858-9 A | 5/2002 |

(Continued)

OTHER PUBLICATIONS

International Search Report dated Jul. 22, 2015, issued in corresponding International Application No. PCT/BR2015/000063, filed May 7, 2015, 7 pages.

*Primary Examiner* — Mark A Laurenzi
*Assistant Examiner* — Shafiq Mian
(74) *Attorney, Agent, or Firm* — Christensen O'Connor Johnson Kindness PLLC

(57) ABSTRACT

A sealed portable industrial furnace for optimizing the concurrent production of charcoal, fuel gas, pyroligneous (Continued)

extract and tar includes an upright metallic body for receiving wood or biomass. A cover is mounted to the upper end of the upright body and the pressure relief system is incorporated into the cover. A perforated base structure is attached to the lower end of the upright body, and a discharge valve is incorporated into the base structure and is closed during production of the charcoal and then is opened to unload the charcoal produced. A support skirt encircles the base structure to support the body in upright position and defines an expansion chamber for the accumulation of combustion gases generated by the furnace. A series of inlet openings are located along the height of the upright body through which combustion air may be introduced under the action of a control system which receives temperate data from temperature monitoring devices located along the height of the body.

20 Claims, 4 Drawing Sheets

(51) Int. Cl.
| | |
|---|---|
| *C10B 33/04* | (2006.01) |
| *C10B 49/02* | (2006.01) |
| *C10B 3/00* | (2006.01) |
| *C10B 7/06* | (2006.01) |
| *C10B 17/00* | (2006.01) |
| *C10B 39/04* | (2006.01) |
| *C10B 39/14* | (2006.01) |
| *C10B 41/00* | (2006.01) |
| *C10B 53/02* | (2006.01) |
| *F01K 11/02* | (2006.01) |
| *C10B 1/04* | (2006.01) |

(52) U.S. Cl.
CPC .............. *C10B 17/00* (2013.01); *C10B 33/04* (2013.01); *C10B 39/04* (2013.01); *C10B 39/14* (2013.01); *C10B 41/00* (2013.01); *C10B 49/02* (2013.01); *C10B 53/02* (2013.01); *F01K 11/02* (2013.01); *Y02E 50/14* (2013.01)

(58) Field of Classification Search
CPC ........... C10B 33/04; C10B 17/00; C10B 7/06; C10B 41/00; C10B 39/04; C10B 39/14
See application file for complete search history.

(56) References Cited

U.S. PATENT DOCUMENTS

| | | | | |
|---|---|---|---|---|
| 6,112,677 | A * | 9/2000 | Kuntschar | C10J 3/002 110/255 |
| 8,419,812 | B2 * | 4/2013 | Ershag | C10B 1/04 48/67 |
| 8,475,551 | B2 * | 7/2013 | Tsangaris | C01B 3/342 423/644 |
| 8,546,636 | B1 | 10/2013 | Potgieter et al. | |
| 9,150,806 | B1 * | 10/2015 | Potgieter | C10K 1/20 |
| 9,598,641 | B2 * | 3/2017 | Deev | C10B 1/04 202/117 |
| 9,976,095 | B2 * | 5/2018 | Potgieter | C10K 1/20 |
| 2014/0124353 | A1 * | 5/2014 | Deev | C10B 1/04 201/14 |

FOREIGN PATENT DOCUMENTS

| | | |
|---|---|---|
| BR | PI0506224-1 A | 10/2007 |
| BR | PI0603622-8 A | 4/2008 |
| BR | PI0603623-6 A | 4/2008 |
| BR | PI0804554-2 A2 | 7/2010 |
| BR | PI1001523-0 A2 | 2/2014 |
| ES | 2 277 875 T3 | 8/2007 |

* cited by examiner

SECTIONAL VIEW OF THE FURNACE SHOWING THE DIMENSIONS AND REGIONS OF THE FURNACE

*FURNACE SECTIONAL VIEW,
DETAILS OF OPENING AND CLOSING OF THE LOADING AND UNLOADING*

SCHEME OF THE CUT OF FURNACE AND CARBONIZATION

*SECTIONAL VIEW OF THE FURNACE AND UNLOADING SYSTEM*

INDUSTRIAL PROCESS USING A FORCED-EXHAUST METAL FURNACE AND MECHANISMS DEVELOPED FOR SIMULTANEOUSLY PRODUCING COAL, FUEL GAS, PYROLIGNEOUS EXTRACT AND TAR

FIELD USE

This patent relates to a process and a furnace designed for charcoal production with the recovery of the gases, tar and pyroligneous extract.

PRIOR ART

This invention relates to a process and a furnace for industrial production of charcoal and recovery of the gases generated in the process, in order to solve the problem inherent to carbonization process as implemented today by most charcoal. In Brazil, most of the charcoal production, around 70% comes from the traditional charcoal kilns of brick kilns, said "rabo-quente furnace." These furnaces have a low percentage yield by weight in the conversion of biomass into charcoal and have high long production cycles. Typically they are spending five days to carbonize biomass and 7 days to complete cooling, i.e. between the loading and unloading are used about 12 to 14 days.

In the traditional process for producing coal in brick kilns type "Rabo-quente", wood and coal are respectively loaded and unloaded manually, subjecting the furnace operator to severe and harsh working conditions. The process control means are highly subjective and dependent on the experience of the operator who must evaluate as sensory criteria, parameters such as the color of the smoke to determine the closing of the openings in the furnace wall. These openings, done manually, are called "baianas" in the furnace surface and "tatus" in the furnace base. In addition, generated gases in the carbonization process are released into the atmosphere without any control and/or use, resulting in a significant energy waste. The released gases by these furnaces still harm the operators working environment, as the smoke released when in contact with eyes and mucous membranes cause irritation and may also contain toxic substances. Added to the problems reported here, there is still the question of the large-scale production to meet the major consumers of charcoal, efficiently, automated, mechanized at low cost and without damaging the environment.

Since 2001, we presented to INPI a series of patent grant requests containing proposals for the solution of these problems. These requests related to the object of this report are discussed and presented in chronological order below.

On Oct. 2, 2001, it was filed with the INPI under the number PI 0104858-9 the request for the grant of a patent relating to a Container furnace for the production of charcoal. In this application, we sought a metallic furnace with forced exhaust gases, which must be placed in a combustion chamber inside an insulating well. In the combustion chamber, forestry waste or low grade firewood is burned to provide power to the carbonization process. This invention has only one control valve to the whole process, which is located below the combustion chamber of the furnace. The gases from the process are sucked by a hood, burned and then discarded to the environment. This system, although it has been proposed to solve the problems mentioned above, such as shorter carbonization time and improve process control and improve working conditions for workers, not completely cover all energy, environmental and operational issues. For example, by this charging system must be done manually. The cooling step takes place inside the furnace, which reduces the uptime of each furnace. Furthermore, the system is equipped with only one control valve, which for small volumes can be acceptable, but for industrial furnaces of large volume, such as on the proposal of this invention are not effective, being necessary the process control in several points of the furnace. Therefore, it is a project, even surpassing the prior art of the carbonization process, does not present at the time of its protocol all additional conditions required to complete solution of the energy, environmental and operational problems. These conditions and improvements were being presented in other patent applications and processes required to INPI, from 2001, including this new patent application, which we require at the present time (2014).

On Dec. 29, 2005, it was filed with the INPI under the number PI 0506224-1 the request for grant of a patent relating to a gasifier coupled to a Container furnace. The document discloses the use of the container Furnace as a gasifier through the combined input of steam and oxygen by means of gas distributors inside the furnace in which biomass gasification processes. PI 0506224-1 also discloses the use of fuel gases as an energy source for the drying process of wood; the use of thermal insulation to increase the life of the furnace; and the presence of a breast water to ensure the tightness of the furnace. This proposal or innovation claim is an improvement or enhancement in relation to the (PI 0104858-9) because it uses a combustion chamber below the furnace for supplying power to the process; It uses forced extraction of gases; there is a cost effective method of sealing the furnace and the process takes place in mobile metal furnaces. Although the PI 0506224-1 document deals with the Container furnace functionality as a gasifier, is not offered a definitive solution to the production of large scale charcoal, since the charcoal yield in a carbonization furnace which operates as a gasifier is low compared to the traditional process. This invention, filed in December 2005, aims to present and/or characterize the Container furnace as a gasification equipment, associated with a carbonization system. However, it still does not present complete solutions for environmental mechanization, automation and optimization, energetics and operational, which will be demonstrated in this application.

On Apr. 28, 2006, it was filed with the INPI under the number PI 0603433-0 the request for grant of a patent relating to a continue production process of coal in Containers furnaces with use of fuel gases from the carbonization of biomass. In this document is presented as main innovation to prior applications, the concept of metal furnace provided with orifices with control mechanical valves distributed to the side of the furnace. These valves can be opened or closed as required and continuation of carbonization. At the beginning of the process, the furnace must be placed inside a masonry shirt under a combustion chamber, which provide the energy required for carbonization of biomass. This chamber may have one or more air inlets to assist the control. According to PI 0603433-0, the proposed invention presents a time of carbonization between 8 and 16 hours depending on the moisture content of the wood. This time is significantly shorter than the carbonization time of a brick furnace, which is an average 5 days. For small and/or low thickness biomass, such as antlers and grass, carbonization lasted between 3 and 4 hours. It is understood by a final carbonization, the production of charcoal, characterized by containing a fixed carbon content between 70 and 85%. This application also reveals that the basic cycle consists of four steps: loading, carbonization, cooling and unloading. For each step is necessary a Container furnace to ensure the continuity of the cycle and to a greater production, it is necessary to manufacture multiple furnaces in cyclic operation.

PI 0603433-0 presents innovation to the state of the art the presence of air intake valves positioned over the lateral surface of the metal furnace. This is an important solution, since it allows the operator a control of the air inlet by on/off closing/opening, gradual or full, so that the inlet air flow can be monitored by equationing of the input speed, area and valve opening time. This is an evolution of the manual process to a mechanized and potentially automatable process. The controlled form of air injection also allows an optimization of the energy content of the gas generated in the carbonization, qualifying it as a potential fuel for use, for example, in generation of electricity.

However, on the need to keep coal inside the Container furnace during the cooling stage, the proposed invention in PI 0603433-0 makes impossible the continued use of the furnace, only to coal production. Furthermore, the document does not disclose a proposal to solve the rapid or instantaneous unloading the furnace.

Continuing with the same project on Aug. 11, 2006, it was filed with INPI under the number PI0603622-8 a patent grant request referring to a continuous production process of charcoal in Containers furnaces, this time considering the design with the exhaust gas system, which can occur at the bottom, top and/or side of the furnace. In this request, the main improvement over the previous process is the establishment of three options to the exhaust point in the furnace, which may be effected by top, bottom or side, alone or in combination. This innovation also consists in a evolution or innovation of the prior art, since in any process or carbonization technology does not occurs simultaneously exhaustion of gas in distributed form over the entire loading surface, which enhances productivity and yield, as it provides greater area and volume in homogeneous conditions of fluid dynamics and heat transfer. In traditional processes, it is conventionally the occurrence of carbonization front or line that runs through the load usually in a single direction, especially in the vertical direction or along the length of the logs. Obviously, coexists a carbonization front that occurs individually in each biomass part, of the external way (bark) to the center or core of the log.

Also on Aug. 11, 2006, a second patent grant request was filed with INPI under the number PI0603623-6 for a continuous production process of charcoal in Containers furnaces with ignition at top, bottom and sides of the furnace. This is an improvement over the prior art, since the ignition usually takes place solely by bottom and/or top of the furnace. Similarly to the application PI0603622-8, this solution intends to ensure the use of this feature in an exclusive way.

However, in the course of development of this research, technically, the addition of two or more exhaust points leads to the need for greater control over the process due to different carbonization fronts formed. In addition, ignition points at different positions in height and circumference of the furnace lead to unsafe operation because gases generated by one of the carbonization fronts may come into contact with the produced flame/coal by another front. Depending on the temperature and hydrogen content, water vapor and oxygen in these areas, there is a risk of explosion. Given these possibilities/risks, improvement proposals in PI0603623-6 did not moved and did not result in real gains. In addition, this system does not propose a global solution, that make it viable, technically, economically, environmentally and energetically the operation of an industrial plant for production of charcoal.

On Oct. 10, 2006, it was filed with the INPI under the number PI0605093-0 a patent grant request concerning the Container furnace for sugarcane bagasse and/or biomass gasification. In this application it is described a gasification process using the Container furnace. Similar to previous texts is emphasized that this request does not propose a solution for coal unloading in order to release the furnace from cooling process, but reveals the use of spray nozzles to speed up the cooling process inside the furnace.

On Oct. 24, 2008, it was filed with the INPI under the number PI0804554-2 a patent grant request relating to a process and automated equipment of charcoal continuous production, with continuous monitoring of weight and temperature. In this request is described a method and equipment for charcoal production, comprising a metallic furnace with distributed automatic valves on furnace surface, dividing the furnace into 'n' areas, according to the needs of each project. The furnace may further be provided with an inner liner to distribute gases. The process is monitored via mechanisms for measuring temperature, pressure and weight and controlled via manual or automatic devices. Process Control is assisted by a software that establishes a pattern curve or process map and continuously informs the operator which points of the furnace controls and adjustments will be necessary. The production cycle of this process involves four steps, requiring a furnace in each of them, to ensure the continuity of the cycle. This document also discloses the use of the furnace itself to promote rapid cooling of the charcoal produced by spraying water inside the furnace or by cooling (in external heat exchanger) and gas recirculation in the furnace. PI0804554-2 also proposes that the furnace loading and unloading are done with the same being "tumbled", i.e., in the horizontal direction. In summary, the presented solution tries to solve the problems inherent to industrial process of charcoal production, but it fails when again it back using the furnace, dimensioned object and designed to withstand the high temperatures, to promote cooling. Again this solution still does not show a global innovation as the optimization and energetic efficiency, environmentally and operationally of the process for nullifying the exclusive use of the furnace for the carbonization process, for not presenting detailed solutions of mechanization, automation and control. Another flaw presented in the process concerns the proposals for loading and unloading the furnace. "Topple" the furnace, in other words, remove it from the vertical position and rotate it to landscape, results in a complicated process, especially when working with large capacity furnaces (up to 30 m3 of usable volume). The needed equipment to carry out these operations are costly, decharacterizing the industrial application of this type of loading/unloading for an industrial furnace. Another aspect to be considered refers to the sizing of the furnace, which should have structural reinforcements to meet the proposed charging, resulting in an increase in design cost.

On Dec. 3, 1998, it was filed with the INPI by a third company under the number PI9806361-8 a patent grant request related to a process and furnace for the destructive distillation of wood in order to obtain charcoal and/or recovering volatile wood products, or obtaining the dry wood. In this document, the reactor used to promote the carbonization of organic matter has a cylindrical shape, which is positioned horizontally. In this reactor, the wood is supported by rails, whereby part of the gases produced during carbonization itself is returned to heat the pyrolysis bed of a second reactor. In the upper region of the reactor during the carbonization stage, the injected gas and the produced gases are sucked and pass through a separator. A portion of the gas is then reheated in a heat exchanger to 280° C. to 450° C. and reinjected into the bed through the pyrolysis furnace grids. It is therefore an upward gas flow inside this vessel.

The remaining pyrolysis gases will go to a combustion chamber and the products of this reaction are brought to the reactor during the drying step of the wood. At the gas stream that is injected, are added the gases released during drying. Similarly to the pyrolysis reactor, the gas flow is upward.

The sucked gases from the drying chamber are then taken to a third reactor, in which it runs through the produced coal also upwards promoting its cooling.

All drying, combustion and cooling processes occur simultaneously and take an estimated time of 18 hours. The equipment related to combustion gases and heat exchanger are fixed, as well as reactors, which occurs simultaneously and consecutively the steps of pyrolysis, drying and cooling. For all the steps can occur in the same reactor, the ducts are always exchanged and a tank assumes the following cyclic steps: pyrolysis-cooling-drying. That is, in this process, the reactor is fixed and the flow of gases is mobile; there is a reversal of the flow of drying, of the pyrolysis flow and of cooling flow between the reactor during all the process.

The objective of this patent, P19806361-8, filed by third parties, is to promote charring, drying and cooling simultaneously in different containers, with alternating flow of gas generated and produced during the process, either by the reactors themselves/load or with the use of external equipment such as heat exchangers.

The drying process described in PI 9806361-8 has some disadvantages. Most of them comes from the fact that there is many equipment, pipes and registers to promote the turnover among containers/reactors. Thus, not only the control strategy becomes more troublesome, but there is great potential for the occurrence of problems such as condensation, incrustation and obstruction because of the condensable gases arising from coal production, such as tar and pyroligneous.

As in the same reactor simultaneously occurs pyrolysis, cooling and drying, there is not possibility to build a tank that specifically meets each of these steps. There are no construction details given in the patent, but it would be ideal that the tank in pyrolysis was a thermal insulator and that otherwise occur during cooling. This lay-out creates the obligation for either property have to be prioritized in the configuration of a single device with multiple uses.

In the patent PI 9806361-8, it is mentioned that wood will not be burned to start the carbonization process, but there is no mention of how its start-up will be given. One possibility would be a gasometer for gases storage that will be circulated, but due to the presence of condensables, this idea can not be as viable as simple combustion of an initial amount of wood.

The processes shown in the present state of art, therefore, flaws in their design and conception and they do not offer complete solutions to the problem of industrial production of charcoal. All constructions use the furnace for the production of charcoal as a container for promoting coal cooling and there is not a solution comprising technical, economic, energetic and environmental viability simultaneously. This present application intends to present this innovative solution, global, that covers and outperforms other filed applications, in particular for the energy use of biomass, furnace operation, design, layout and operational logistics including coal unloading in order to release the furnace from cooling step, which increases effectively the process productivity; allowing the furnace to be used for its most noble and sole purpose: coal and fuel gas production.

SOLUTION OF THE PROBLEM

The industrial furnace for charcoal production consists of a metal, mobile container with cross section predominantly circular, whose aim is to convert biomass inserted inside in charcoal, in the shortest possible time and with greater gravimetric yield (ratio between the mass of charcoal per mass of dry biomass). The proposed solution encompasses, besides the carbonization Container furnace, all other system components, which together enable this project to an energetically, operationally and environmentally production from biomass derivatives: bioredutor (charcoal), tar, pyrolignous liquor and combustible gases.

Thus, the project comprises a unique and differentiated system of gases and vapors generated during the carbonization process. This system comprised by an exhauster generates the necessary depression inside the container as well as a special fluid dynamics, which promotes both gases exhaustion and the injection of atmospheric air. The effect of gases exhaustion, together with the control mechanisms and ignition of the process allows to reduce the time required for the conversion of biomass into charcoal from 8 to 12 hours (which constitutes the best results referred to in the processes described in the prior art), for a time less than 4 hours—this amount was established for a wooden mass put into the furnace around 10 tons. This advance, specifically for productivity, was only possible due to furnace design improvement and support structures, layout of the plant, mechanization, automation and operation of process control techniques, which are described in this report in due course.

Masonry furnaces for the production of charcoal have as a major drawback the fact that their high time for converting biomass into charcoal, as mentioned above, between 12 and 14 days. This high time is partly due to bad distribution of gas flow inside the furnace.

The industrial furnace for the production of charcoal solves this problem by the introduction of holes at strategic points along the external surface of the furnace, so as to maintain the rate of isotherm of 200° C. always high. This is achieved by the heat of the furnace profile analysis over time of carbonization and the subsequent introduction of holes at the points of lower speed. The furnace, object of this patent, had their points of slowness or deceleration of the front of carbonization (which we call isotherm of 200° C.), mapped and minimized by adding holes to the atmospheric air inlet. The inlet air in these specific points accelerates carbonization, since it promotes the combustion of the combustible gas present in this region; which ultimately "pull" the carbonization line, which usually occurs from top to bottom in the vertical direction of the furnace.

No carbonization furnace either metallic or masonry, in operation today and/or in remote dates has in its structure, this type of industrial control input and the air flow, which can be manual or automated and still restricted to the inlet air, enriched oxygen, or even a heated inert gas. In traditional brick furnace, especially the "rabo quente", these air inlets, called "baianas" and armadillos are manually operated a sensory and handmade way, with no possibility of an enhanced control of input flow and monitoring of the speed of isotherm or carbonization front, that is not merely sensory, by touch and smell. Coupled with the absence of proper control of temperature and oxygen supply, in the "rabo quente" furnace there are presence of cracks and holes in the masonry wall that result in frequent explosions and collapse of the furnaces, with consequent financial loss.

The present invention provides as a solution to the problem of unwanted leakage of air and explosion in a sealed metal furnace with physical isolation in all areas and bases which connect the furnace to the rest of the structure and/or allow controlled air entrance. To ensure this seal, valves for air inlet are mechanical and have the gasket seal. Likewise, the furnace base and the top cover for charging have sealing ring with cooled flange. Moreover, the design/furnace presented as an industrial solution in this invention has valves to pressure relief, appropriately designed and positioned over the structure and of the furnace set coupled to the gas conduction pipe system. Such valves operate, whenever necessary, such as relief systems, opening and returning to the original position without any dependence of human activity. This is an important advantage of the proposed furnace for industrial production of charcoal compared to the remaining carbonization furnaces because it allows to regulate pressure inside the furnace.

Another advance of extreme importance to the state of art is the development of a mechanism that allows unloading of coal still hot from carbonization furnace in a second cooling container to, thus release the container furnace to its more noble use: the exclusive production of charcoal.

For this, the Container Furnace has a bipartite discharge valve, located in the lower region of the furnace, whose function is to release to base the charcoal produced without waiting for the cooling step. With the inclusion of the lower discharge valve the availability of the Container furnace for the productive process is increased considerably, reducing the number of investment in furnaces. Although the vent valve is the key element for this inventive jump, the proposed solution consists of a series of points, which together enable the unloading of coal, still red-hot, safely and quickly. This design allows the furnace to be designed and manufactured with adequate thermal insulation, i.e., light and efficient. The results of energy balance showed that in this way, the thermal losses of this furnace is less than 5% of all the energy contained in the firewood, this fuel with a moisture content of below 30%. The second advantage derived from this invention is the design and fabrication of a container own for receiving coal still in carbon fixation step, i.e., above 400° C. It is a metallic cylinder, but with low weight, below 4 tons, with no insulation and equipped with a unique system of water sprinklers on the coal during the unloading. This controlled water spray system over the falling down coal does not interfere with the mechanical properties thereof, since the amount of water does not exceed the volume required only for enthalpic energy removal or vaporization thereof. And especially, the water spray reduces by more than 70% the time needed for coal cooling in the proper carbonization furnace without loss of their mechanical properties and also without unintentional and uncontrolled maintenance of carbon fixation process that occurs in other prior art furnaces.

The furnace charging process was also optimized. Instead of loading the furnace from the bottom, as described in the prior art, the present invention, object of this report proposes a loading system from the upper part of the furnace, eliminating the necessity to rotate, tilt or tip over the furnace for loading. This improvement over prior art considerably reduces the charging time of the furnaces, resulting in productivity gain by increasing the availability of the furnace for the carbonization process. Charging from the top also allows a better homogenization of the load and greater operational regularity.

This new technology has an exclusive and unique system of simultaneous monitoring in real time of all process variables, as follows;

Content of firewood moisture
Mass of firewood put into the furnace
Gravimetric yield in coal
Content of pyroligneous in the collected gas.
Air intake flow
$O_2$ stoichiometric excess percentage in combustion reaction
Complete combustion percentage
Collected tar fraction, condensed and burned
Collected pyroligneous fraction, vaporized and burned
Temperature measurements (gas, insulation, furnace, housing, coal)
Activation energy of the reaction
Pyrolysis Heat
Percentages of fuels derived from wood that provide energy to the carbonization process
Exhaust Flow
Content of $O_2$, $N_2$, $H_2$, $CH_4$, $CO_2$, CO and CnHm of non-condensible gas
% excess of stoichiometric air
% of complete combustion
% of burning coal
% burning tar
% burning pyroligneous
% burning CNG
% of the reaction between C and water vapor
% of complete combustion reaction of C with the formation of CO and H2

The innovations proposed as a solution to these problems will be presented in detail in the following items.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DESCRIPTION OF THE INVENTION

Figure 1:
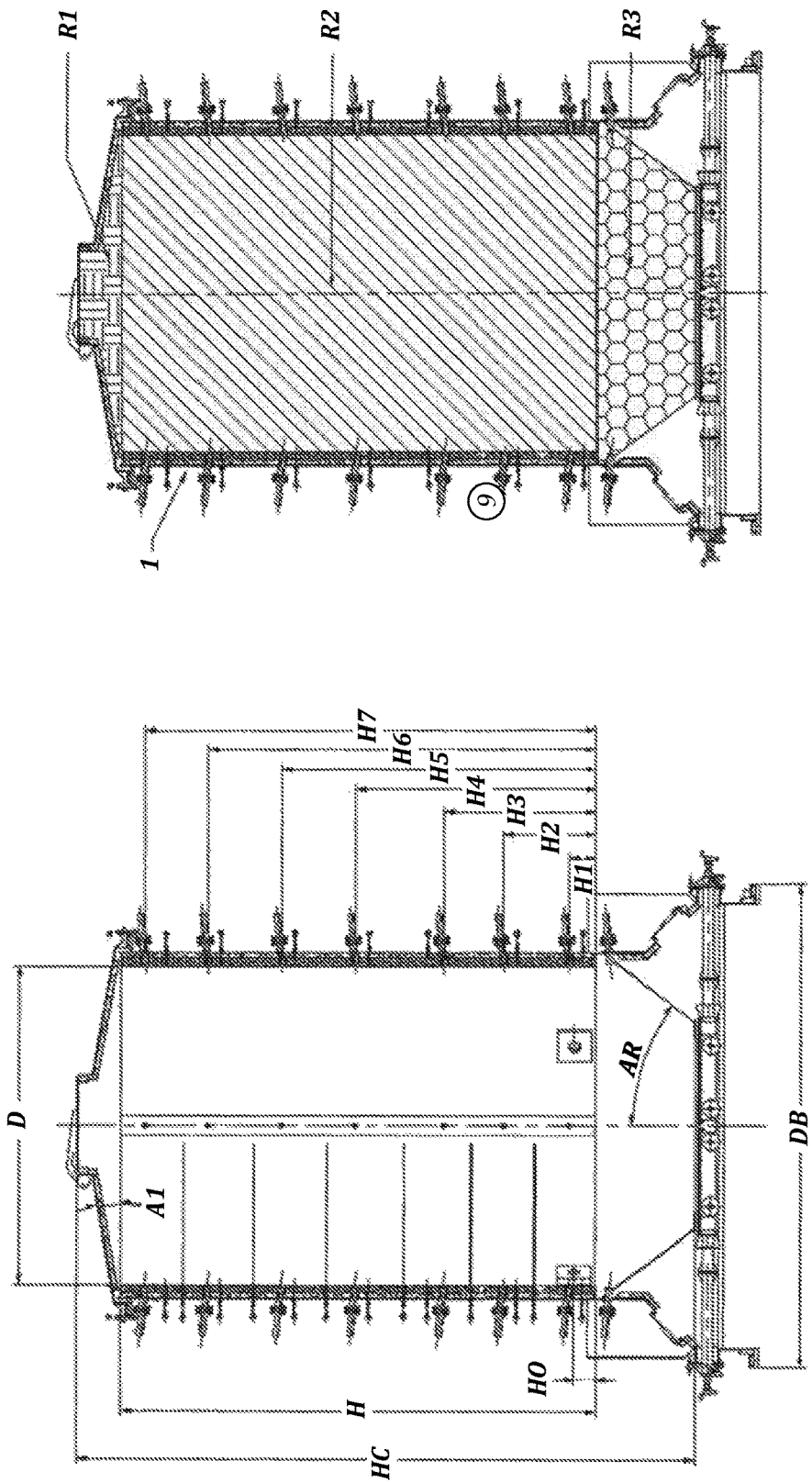
FIG. 1 shows sectional views of a furnace for the industrial production of charcoal and the recovery of generated gases.

The metal container of the industrial furnace (1) for the production of charcoal has its inside volume divided virtually into three parts according to FIG. 1: Top (R1), core (R2) and lower frustum (R3). There are no physical barriers between regions; the division listed here is done only to simplify the description of the various components of the proposed solution.

Figure 2:
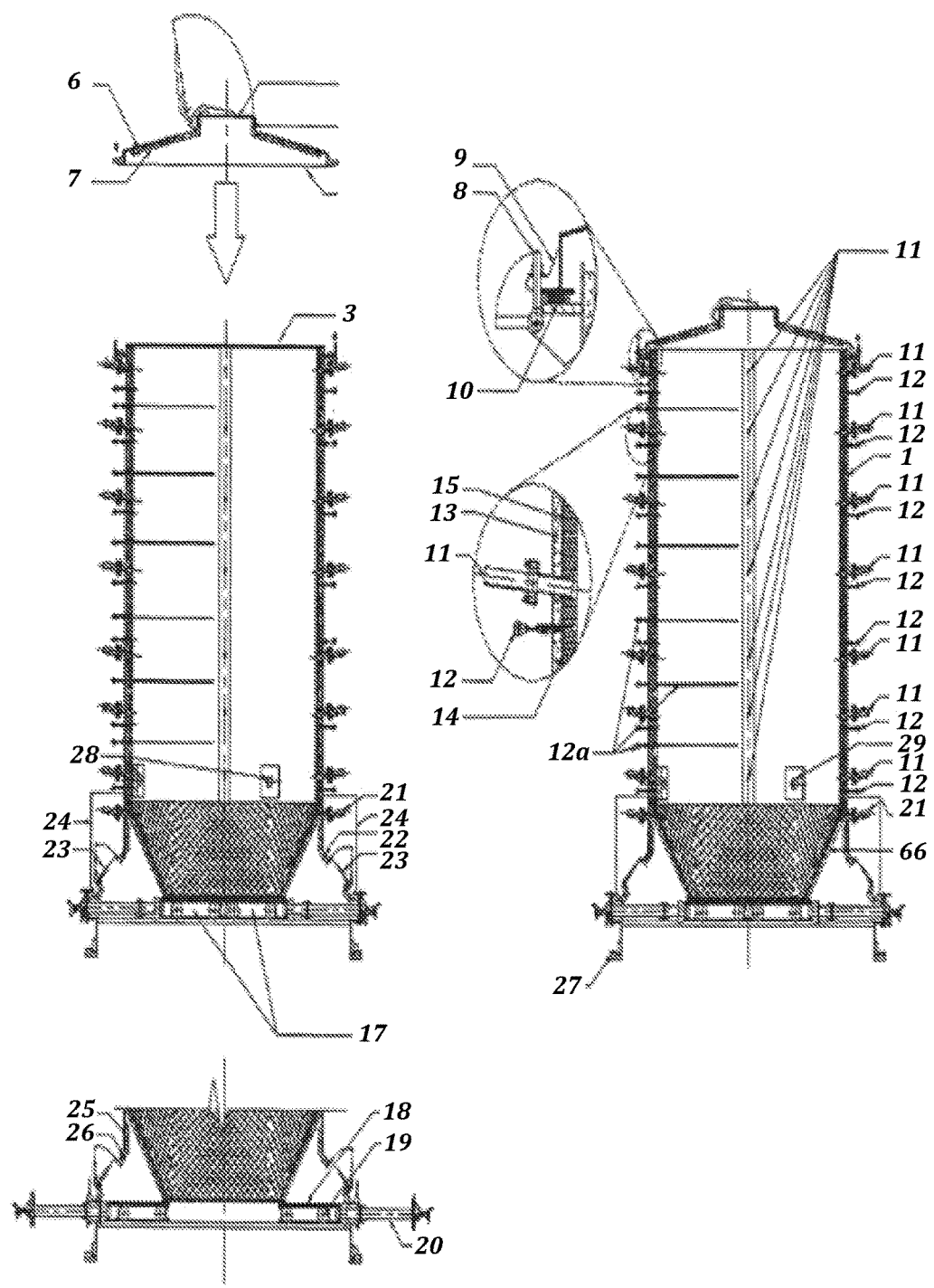
FIG. 2 shows cross-sectional views of the furnace of FIG. 1 illustrating the opening and closing of the furnace during the loading and unloading of the furnace.

The top region (R1), located at the top of the furnace may be in cone shape or torresferic. This region may be partially divided or completely separated from the central cylinder, as shown in FIG. 2, assuming the cover function (2) to the biomass charging hole inside the furnace (3). Moreover, its truncated cone-shaped or torresferic shape allows the creation of relief mechanisms to control the internal pressure of the process (4). This pressure relief mechanism is defined as a relief hole, preferably circular in the surface of the top region sealed by a mobile relief cover, compatible with the hole that vertically moves upwards when the internal pressure rises beyond the expected and returns to the seat of the hole when regularized the internal pressure. The hole may be positioned anywhere on the top surface of the region, but it should preferably be concentric with the diameter close to the furnace. The relief cap should have an area and weight compatible with the furnace with the raw material and the process, which to this invention corresponds to an area ranging between 0.25 and 0.45 m2 and weight between 30 and 55 kg. The initial dimensioning of valves for burst relief had a base on the standard NFPA68/2007, but due to limited applicability of this standard to the industrial furnace for charcoal production, the final values for area and weight was due to the development of own mathematical models associated to blast tests conducted in situ in the furnace. The seal (5) between the cover and the relief hole must be made by a material resistant to temperatures up to 95° C., soft to absorb impacts and promote the sealing, since the pressure necessary to ensure sealing process will be function only of cover weight. The mobile relief cap has its vertical travel limited by a series of tabs, preferably three equidistant or hinged connecting the pressure relief hole cap (4) to the top region (R1).

In its optimal configuration, the top region has the largest diameter, in the case of frusto-conical shape equal to the diameter of the central cylinder region, with a frustoconical inclination to the vertical must have an angle (A1) between 8 and 25°. The region is internally insulated with ceramic fiber blanket (6) and this is isolated from contact with the raw material inside the furnace by a thin plate (thickness 1.5 mm) of stainless steel (7). This plate also prevents contact of the insulating blanket with vapors and tar dispersed in the internal atmosphere of the furnace. The top region (R1) is fixed to the central cylinder region via specific mechanisms positioned near the larger diameter top. These mechanisms are pivot pins (8) secured to the central cylinder region which fit over guides (9) attached to the top region (R1). The joint is sealed using special seals for high temperature (10). The pressure required to ensure the seal is made possible by threads presented on pins and nuts placed on the guides.

The called central cylinder region (R2), shown in FIG. 1 corresponds to the main area of process control. The central cylinder preferably has diameter (D) of 3500 mm and height (H) of 4800 mm. Its lateral surface has a series of holes, shown schematically in FIG. 2, provided with flow control mechanisms (11) (control valves). These valves are distributed as follows: four (4) columns of valves equally spaced along the perimeter of the cross section and each column there are valves distributed in 7 positions along the furnace height. There are a total of 28 holes (11) through which they can inject gas into the furnace or use as a leak in case of overpressure during the conversion of biomass into charcoal. These 28 valves (11) are responsible for providing atmospheric oxygen to the perimeter area of the furnace. Furthermore there were placed four (4) tubes which connect the furnace wall to its inside in a diameter close to the center. These four tubes are also equipped with flow control mechanisms. These mechanisms are ball valves, with ball in stainless steel and focus in material for temperature to 150° C. With respect to height, the tubes are positioned at an intermediate height of the holes located on the lateral wall, with two tubes per level.

The height of each of the valves is determined according to the study of the furnace temperature profile. In this study, it was evaluated the speed when the temperature isotherm at 200° C. value moves along the furnace height. The value of 200° C. is said by studies in the area as the temperature at which finishes the drying of wood, i.e., from this temperature begins to roast, followed by carbonization process itself. The studies developed for the preparation of the proposed solution demonstrated that the step of greater length of the conversion process is the drying of the wood linking water, we sought to study the isotherm behavior at 200° C. in the furnace and the means to promote the acceleration of its movement, thus accelerating the drying process. So, it was proceed with analysis of the isotherm velocity displacement at 200° C. due to the positioning of the holes. The data obtained from laboratory tests have shown that the speed with which this isotherm advances in the furnace bed is reduced gradually from the furnace ignition point forward. Only there is the increase in speed of propagation when new approach occurs from an oxygen entry point. Given the typical behavior of the speed of isotherm with value of 200° C., it was possible to affirm and optimize what would be the recommended minimum distances between atmospheric gas inlet holes. The positioning of the holes along the height of the central cylinder region to its optimum configuration can be seen schematically in FIG. 1, according to the detailed study should be distributed as follows: four holes with a 2" diameter in the position (H1) between 5% and 7% of the total height of the cylindrical region measured from the base of the central cylinder, 4 holes with a diameter of 2" at the position (H2) between 18% and 26% of the total height of the cylindrical region measured from the base of the central cylinder, 4 holes with a diameter of 2" at the position (H3) between 30% and 38% of the total height of the cylindrical region measured from the base of the central cylinder, 4 holes with a diameter of 2" at the position (H4) between 60% and 54% of the total height of the cylindrical region measured from the base of the central cylinder, 4 holes with a diameter of 2" at the position (H5) between 62% and 68% of the total height of the cylindrical region measured from the base of the central cylinder, 4 holes with a diameter of 2" in position (H6) between 78% and 84% of the total height of the cylindrical region measured from the base of the central cylinder, four holes with a 2" diameter in the position (H7) between 94% and 98% of the total height of the cylindrical region measured from the base of the central cylinder; all holes are equipped with valves for flow control. The minimum distance between tubes positioned between the holes on the cylinder side is 26% of the total height of the cylindrical region measured from the base of the central cylinder, it is recommended the use of these tubes between the levels located in the furnace base, because at this part the conducting of carbonization process becomes more critical.

In FIG. 2, close to each of holes and tubes, one sensor monitors the temperature at the side (12) and inside the furnace (12a) with the aim of providing an accurate indication about the status or progress of the process carbonization and ensure that the safety limits for proper furnace operation are not exceeded. These devices for measuring temperature may be K-type thermocouples that are embedded in thermowells which house the sensor and electrical connections of tar vapors and mists present inside the furnace. For purposes of control, beyond the side thermocouples, a series of temperature sensors is installed inside the furnace (12a) near the central region, for a better monitoring of the procedure.

The region of the central cylinder (R2) is internally coated with several layers of materials which thermally insulate the metallic housing. The industrial furnace for charcoal production works with process temperatures of around 400° C., but in the region of the holes this temperature can reach peaks of up to 1100° C. This occurs due to the entry of external atmosphere oxygen from the interior furnace, which in contact with the fuel gas and ignition source form a flame like a blow torch. Technically there are materials on the market that can withstand the high temperatures described in this report, but the carbonization process has aggravations that makes impossible the isolated use of these materials. During carbonization are released in addition to the condensable and non-condensable gases, water vapor, tar, pyrolignous extract and volatile compounds present in the ash. The tar inside the furnace is in the form of a fine mist, which would pervade and damage certain types of insulating blankets, as well as the alkalis present in the ash. Furthermore, most of the refractory material presents a percentage of total passageway pore, i.e., they are pores that connect hot face to the cold face allowing the passage of tar, which could damage the outer wall of the furnace. Both the tar, as pyrolignous extract have in their composition a portion of acetic acid which reflect the corrosive nature of the internal atmosphere. Some refractories are incompatible with acidic atmospheres or water vapor. The material to be loaded by the top of the furnace reaches the inner walls with impact, causing wear by abrasion and break conventional refractory materials. The invention, object of this report proposes a solution so as to thermally insulate the furnace, ensuring temperature in the housing of the order of 100° C. and reducing in the maximum the tar passage to the outer wall. The proposed solution is a combination of materials that alone could not meet the process needs, but together meet with accuracy and efficiency. For the region of the holes (considered in this report, the region comprised in a radius of between 100 mm and 200 mm taken from the hole center), the materials for promoting the isolation of internal surface of the metallic cylinder to the inside furnace are ceramic fiber blanket (13) with 2-inch thick, insulating material of low density and relatively low cost (this material is the main responsible for the reduction of the temperature in the furnace housing); smooth stainless steel plate of 1.5 mm thickness (14) covering the entire exposed surface of the blanket; refractory low cement concrete with at least 45% of $Al_2O_3$ mixed with metal fibers in stainless steel at a proportion of 2% by mass of concrete (15) used—this concrete associated with the use of metallic fibers ensures integrity co concrete, avoiding the spread cracks due to process temperature variation. For the outside region of the holes and ignition points, the refractory concrete with metallic fibers is substituted by a refractory concrete with at least 47% of $Al_2O_3$ and maximum density of 2.27 kg/m3 applied on a hexagonal mesh, suitable for concrete anchorage refractories, with total thickness of 27 mm. The use of this concrete in this region coupled to a special curing process reduces the total percentage of full bore pores to 5%.

In FIG. 1, the area called the lower frustum (R3) consists of an inverted frustum, or in a transition of a circular cross-section to a square with rounded corners made of sheet metal. In FIG. 2, this cone (16) must be drilled to allow the passage of gases from biomass bed to the bottom, however, retaining the biomass. It is recommended that the holes have a diameter of 40 mm with an average spacing of 120 mm holes, or at least 20% of free passage area in the lateral area of the cone. The tilt angle for the cone should be such that promote the flow of charcoal without retentions flow. FIG. 1 shows for charcoal this angle (A2) varies between 30° and 50°, with an optimum configuration the inclination of 36°. The larger diameter of the frustum must follow the diameter of the central cylinder region.

Located in the lower portion of the lower frustoconical region and seen in FIG. 2, it is located a discharge valve (17) of charcoal. This valve consists of a blocking surface of the solid material located above it and must allow the passage of gas and condensables generated in the process. The valve must be mobile, clearing the passage at the end of the carbonization process in order to unload the charcoal produced. For that meets the minimum requirements, this valve must be flat with holes distributed over the surface uniformly so as to allow the passage of gases and retaining solid objects such as the inverted frustum. The diameter of the holes may be similar to that used in the cone, but the percentage of hollow area on the opening area must be at least 20% in order to ensure maximum flow for the gas flow. A flat surface with a hole (18) is installed on a frame provided with wheels (19), which in turn is on a track that allows the displacement of the cap and structure in only one direction. Turning the structure to the external environment there is a stainless steel metal rod (20). The set cover, frame with wheels and rod gives the name of car cover. In the lower region, some of the frustum holes (21) establish, through ducts, contact with the external environment for the injection of gases, such as atmospheric air, dosed for specific control mechanisms such as valves. These valves are ball valves, with ball in stainless steel and seat in material for temperature up to 150° C. The cover may be made of special steel alloy such as ASTM 572.

In FIG. 1, the total height of the volume (HC) comprised by the three regions (top (R1), core (R2) and lower frustum (R3)) on the diameter (D) of the central area (central cylinder) should vary between 1.0 and 2.2. The range of the central cylinder diameters ranges from 3300 mm and 4580 mm, recommended value as optimal configuration of the furnace.

The internal volume of the furnace, available to receive the biomass as feedstock, consisting of the three regions (top (R1) central cylinder (R2) and lower frustum (R3)), hereinafter called "conversion zone" may have volumetric capacity between 35 and 65 m3 with satisfactory results, and the optimum condition equal to 50 m3.

The conversion zone is maintained upright by a holding device whose shape is the association of a frustum and a cylinder with defined proportions made of sheet metal. This device consist of a fundamental point for the invention as will be shown below. This support structure shown in FIG. 2, also called "furnace skirt" (22) acts as an expansion box in the process, allowing the accumulated gases in the furnace base to recirculate, providing an atmosphere of hot gases and facilitating the conduction of process for the preheating of the biomass at the bottom of the furnace. In case of overpressure in the lower frustum region, the "furnace skirt" (22) is provided with specific pressure relief devices, called relief valves (23). Such relief valves must always be symmetrically distributed, and along the circumference of the furnace. The relief cap should be compatible with the area and weight of the furnace, raw material and process for this invention that corresponds to an area ranging between 0.25 and 0.6 m$^2$ and weighing between 90 and 160 kg. Its position is limited to the lateral area of the frustum truncated cone and should be equipped with a duct or chimney (24) that directs the flow from the pressure increase in process or in a secure location. The smaller diameter of the support structure is equal to the diameter of the central cylinder region, with the point of union between the "furnace skirt" (22) and the central cylinder (R2) of about 200 mm above the lower limit. The higher diameter (DB) may vary between 1.25 to 1.35 times the diameter of the central cylinder region. The structure is coated internally with ceramic fiber blanket (25) with a density of 128 kg/m3, protected by a stainless steel flat plate (26) with 2 mm thick. The skirt also acts as an equalizer of the center of gravity of the furnace to make its operation safer about the possibility of an imbalance and toppling.

The furnace support base of the supporting structure of the furnace is provided with water channel (27) for cooling of the carbonization system coupling sealing. Next to the furnace support base are present guides for coupling the furnace to the support base of the carbonization system.

The invention, object of this specification, is provided with special holes called ignition points of process (28). These points may be located in the three regions of the conversion zone, however the ideal position for the ignition process is lower region of the central cylinder shown in FIG. 1, the position (HO) between 5% and 15% of the total height of cylindrical region measured from the base of the central cylinder. The location of this point in the limit given above allows a better control of the process, since although the isotherm of 200° C. gradually advance the ignition point for the rest of the furnace, the ignition in this height of the furnace allows that by means of the hot gases of the ignition process occurs a preheating of the entire conversion zone, increasing the isotherm velocity of 200° C. The size for the hole destined for the ignition process can vary between 4 and 6 inches. Similarly to the holes for the entry of atmospheric air, the ignition holes must be equipped with air flow control devices. As basic requirements for operation the guarantee of sealing, the hole area should not have obstructions (such as, for example, butterfly type valves whose outflow obstruction element bisects the flow passage area) and should be resistant to temperatures up to 200° C. Therefore, it is recommended the use of ball valve, with stainless steel ball and seat material for temperatures up to 200° C. Due to the high temperatures near the ignition point, it is installed in this region a refractory block with at least 70% of $Al_2O_3$, resistant to temperature of 1600° C.

Figure 3:
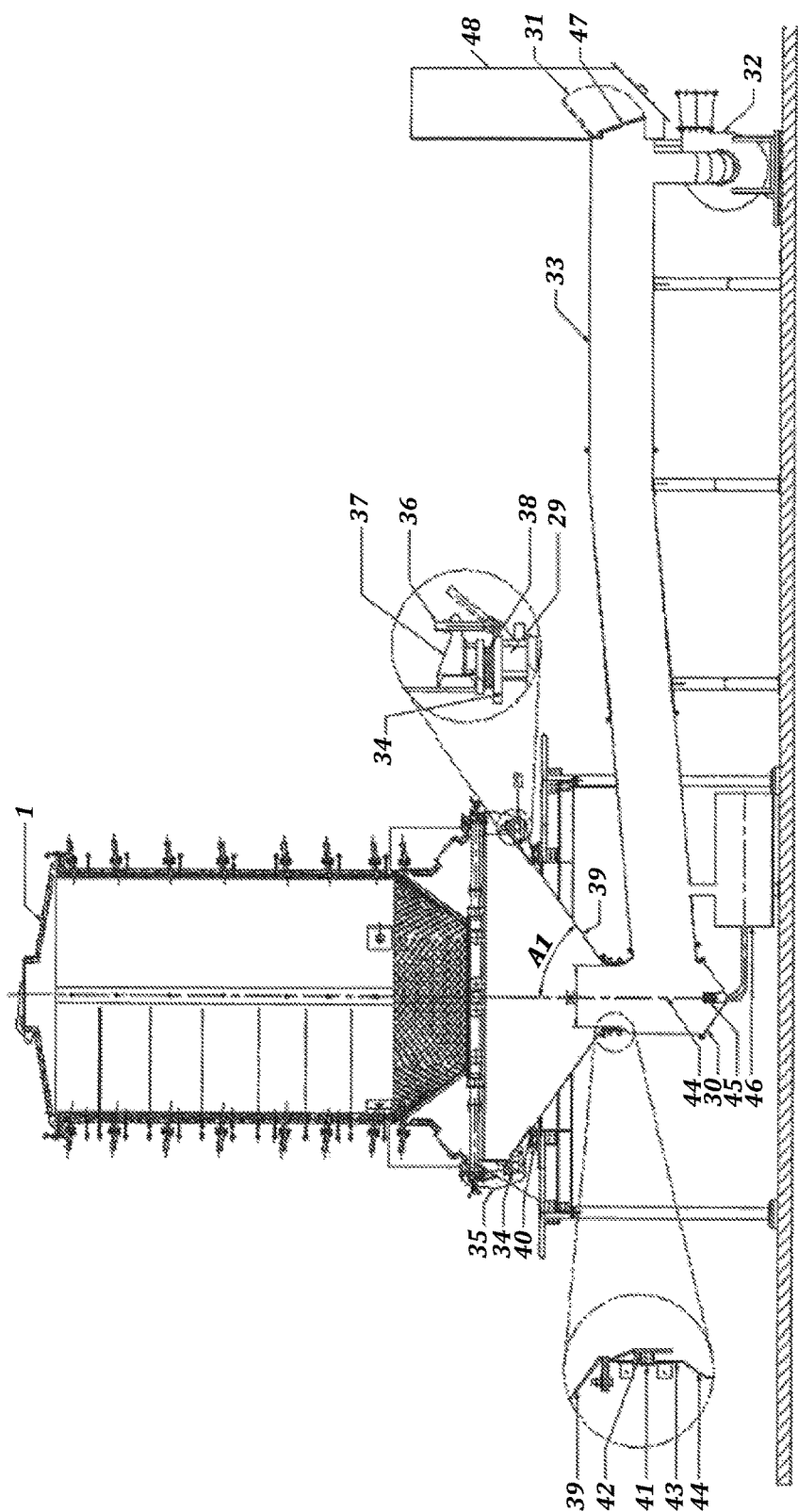
FIG. 3 is a schematic view of the furnace shown in FIG. 1 including the equipment used for gas recovery.
Figure 4:
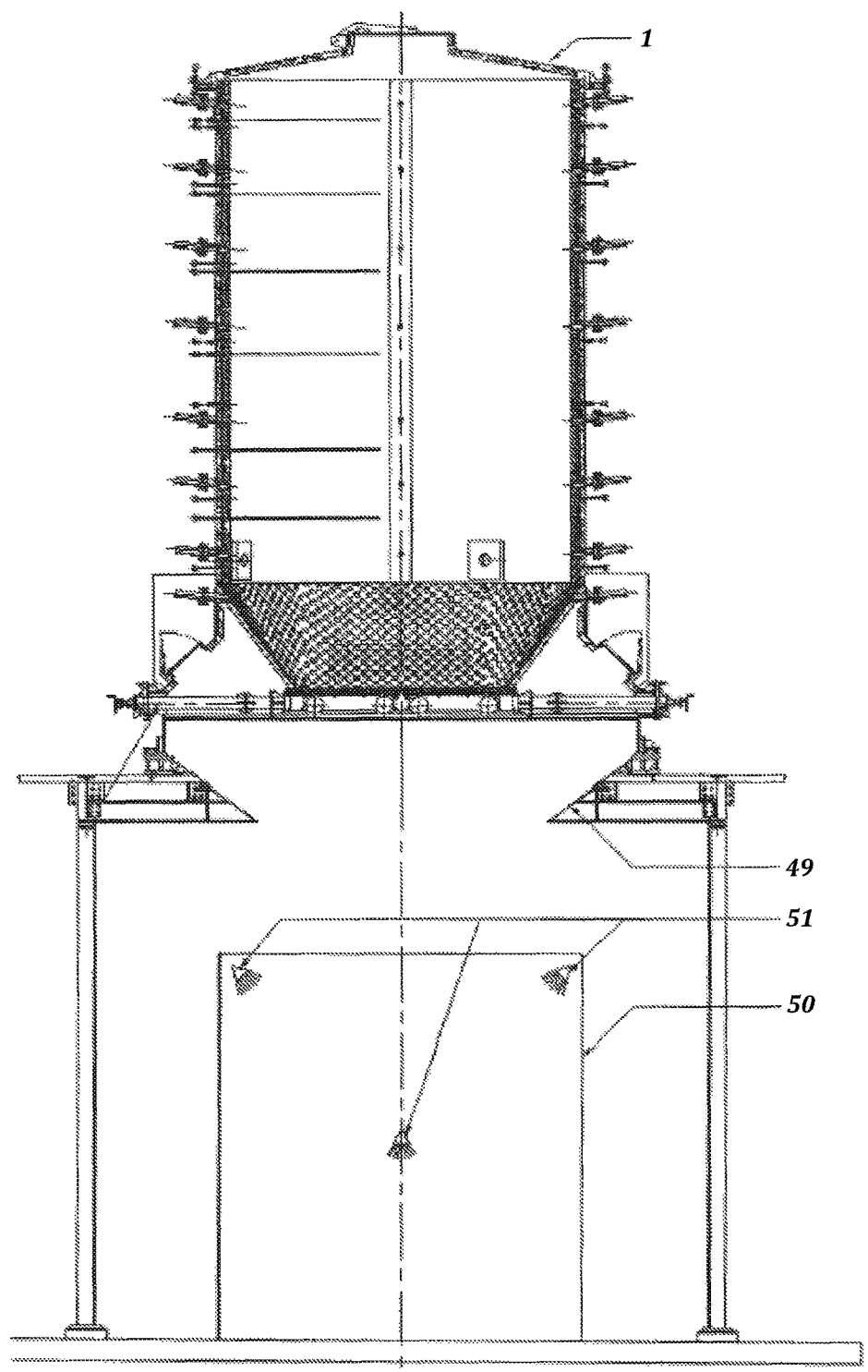
FIG. 4 is a cross-sectional view of the furnace illustrating the unloading of the furnace.

In addition to the furnace described above, this invention makes exclusive use of the carbonization system described below and shown in FIG. 3.

The carbonization system, integrant part of the industrial furnace for the production of charcoal, comprises a movable support base (29), condensable recovery equipment (30), safety device for pressure relief (31), exhauster (32) and conducting ducts of gases and vapors (33). The carbonization system is a fixed equipment in a carbonization plant and the furnace is a movable device that couples to this system.

The movable support base is constituted by a cylindrical ring (34) of diameter equal to the largest diameter of the supporting structure, built of metallic material. Attached to the ring are the guides (35) which has the function of assisting the furnace positioning on the movable support base. Also on the movable support base are installed pivot pins (36) that fit on the guides of the furnace support base (37). Through this mechanism, with the aid of a system of nuts and spindles, the furnace is kept pressed against the movable support base. The seal (38) between the furnace and the movable support base is promoted by the use of special rubber for temperatures up to 90° C. Internally connected to the support ring, an inverted truncated cone (39), made of steel plate, allows uniform capture of the entire gaseous stream and condensable. The larger diameter of the cone should accompany the minor diameter of the supporting ring. The opening angle (A3) should be between 40° and 60° and the smaller diameter (DC) should be sufficient so that the gas flow speed does not exceed 10 m/s.

The movable support base receives this name for being allocated on an industrial weighing system, with articulated loading cells (40) (typically used for road scales) to absorb any lateral shift caused by collision between the furnace and the guides (35) and between the furnace and the movable support base. Therefore, the base has freedom to move vertically, allowing the correct weighing of the material.

Connecting the movable base support to the exhauster, there are a number of pipelines and equipment that conduct the gases and condensable flux out of the furnace. These gases and condensable can be used in other processes, such as combustion to supply heat energy, among others. Due to the presence of the weighing system, the connection between the smaller diameter of the inverted cone movable support base and the first section of the gas pipe must be made using a flexible junction (41). This junction (41) must be resistant to temperatures up to 265° C., made of stainless material and free of spaces where condensable material can accumulate and impair the flexibility of the joint. The solution presented in this invention is the use of two concentric pipes, being the smaller diameter tube (42) physically connected to the inverted truncated cone (39) of the movable support base and the largest diameter tube (43) connected to the expansion box (44). To prevent false air being sucked through the gap between the pipes, a flexible junction (41) made of glass fiber fabric coated with a plastic film, involves the ducts. This flexible junction (41) having one end attached by clamps to the cone (39) in the upper position and the other end attached to the larger tube (43) at the bottom. This assembly allows perfect operation of the weighing system, since it disconnects the set that is supported on the loading cells from the rest of the equipment. Is avoided, thus, the possibility of creating a "lever effect", when the weight of the fuel/carbon contained in the furnace would be influenced or suffer changes depending on the gas flow and pipe handling and remaining system, which would be connected the cone.

Attached to the larger duct, used to connect the expansion junction to the movable support base, there is an expansion box (44) for reducing the flow rate and deposition of particulate matter and condensable. The speed in this region will be reduced to 50% of the speed in the duct. The expansion box is provided with two flow outputs. The first is located on the base of the box and is provided with a filter (45) which allows only the flow of condensable to a storage tank (46). The second output located on the box lateral of the expansion box allows output of gases, vapor and mist still dispersed in the gas stream. In this second output, the duct (33) is dimensioned not to have flow velocity exceeding 16 m/s. This duct follows leading the gases to the exhauster.

At the end of the duct (33), the connection to the exhauster is made perpendicular to the length of the pipe. This is because an explosion door (47) is installed at the end of the duct to ensure operational safety and integrity of the equipment in case of overpressure in the gas lines and/or return of the flame resulting from the flaring of gas in the incinerator. The explosion door is composed of a flat surface, which is kept closed by using only the own weight of the cover. In case of increased internal pressure, the door opens, relieving the internal pressure and directing, through a chimney (48), the exhaust flow to a safe region. This region or gas receiving location should preferably be suitable for burning the gas with capacity for complete combustion thereof.

The exhauster (32), one of the major component of the process, consists of a centrifugal exhauster with nominal flow of 10.000 m³/h and static pressure of at least 250 mmca. The rotor must be made of stainless steel. The equipment must be equipped with speed controller to allow adaptation thereof to the use of different forms of biomass and production process.

The industrial furnace for the production of charcoal has a device for rapid unloading of coal still warm in order to release the furnace for the carbonization process as soon as possible. FIG. 3 shows this device.

The basis for unloading comprises a platform that has a truncated cone (49) with the largest diameter compatible with the largest diameter of the bearing structure (DB) and smaller diameter compatible with the discharge valve (17). Below the platform there is a movable cylindrical container (50) with capacity between 24 and 32 m³ of charcoal. The movable cylinder has 3 to 5 water spray nozzles (51) with a flow rate ranging between 5 and 20 L/min, which are positioned in its interior to cool the burning coal during and after unloading.

On the Procedure for Operating the Furnaces.

The industrial furnace for production of charcoal is loaded with biomass by the upper opening in the in the central cylinder region. For the loading, due to high volumetric capacity of these furnaces, it is preferably recommended the use f conveyor belt with or without silos or storage cylinders/stock, to ensure the constant supply of biomass to the furnace. This procedure ensures a quick loading time, which preferably should be less than 5 minutes to the feeding of 50 m³ of splinter in the furnace whose internal temperature must be above 200° C.

Then the top cover or top region is placed on the central region of the cylinder and fastened thereto with the aid of the threaded pivot pins, guides and nuts. The carbonization furnace is then moved to the carbonization system, where it is then positioned and locked on the movable support base.

Once the furnace is locked, the exhauster is turned on and adjusted so that its speed be compatible with the material used. Typically, it is aimed the maintenance of a constant volumetric flow rate of 6.000 m³/h, being the rotation speed adjusted so that the aforementioned flow rate be obtained.

The ignition process is then initiated. First it is assured that the valves located at the top of the furnace are opened to create a continuous flow of gases within the furnace. Only then the ignition itself takes place. Through the 4 ignition points of the process, a small amount not exceeding 2 kg of needles or burning coal, is injected into the furnace. The heat generated in these 4 points propagates by the lower region while a hot gas stream rises through the bed heating it. The strategic position of the ignition point allows the preheating to a temperature higher than 200° C. all the volume of the bed, optimizing the process, since with all the furnace above 200° C. the conduction of the carbonization becomes faster.

The carbonization process is then controlled by the air inlet holes, which are opened to permit entry of oxygen, which in turn leads to partial combustion of gases inside the furnace. This burning supplies energy to the rest of the endothermic phase of the carbonization process, being in the sequence closed the holes whose regions have reached the limit temperatures for the process.

This process of opening and closing of the valves is repeated until all of the internal volume is at temperatures above 350° C. Throughout all the period the furnace has its weight and temperature continuously monitored. The end of the process is reached when the weight of the furnace charge is equal to the weight stipulated as production target for the furnace.

When production target is reached, the furnace is then uncoupled and removed from the support base and the exhauster is turned off. The furnace is then positioned on the unloading basis wherein automatic unloading mechanisms connected to cover car rods unblock the orifice of the bottom cone region for the unloading of burning coal, with temperatures above 300° C. During the drop of the burning coal, water spray nozzles directed to the descending coal flow promote a superficial cooling of coal. The discharged coal is accumulated in a special container, metallic, non-insulated, for the cooling. Once completed the unloading process, which preferably does not exceed 3 minutes, the vessel containing hot charcoal is closed and sealed, from which follows to complete its cooling process.

The cooling process takes place by natural convection and the enthalpic effect of the removal of evaporation heat of the water that is sprayed, strategically in the regions of the carbon bed where the temperature exceeds 120° C.

This process step, which lasts 10 to 15 hours, ensures the release of the container furnace for continuous charging process, carbonization, unloading, loading, carbonization, unloading . . . and so on in cycles lasting between 3 and 6 hours.

The container furnace tested in pilot scale laboratory had its design optimized, resulting in the manufacture of a pilot furnace on an industrial scale. The changed items were especially related to increased wood put into the furnace capacity, improved instrumentation, control, mechanization, operating procedure, process and thermal size. In this furnace the parameters monitored during the running are: load weight, flow rate, composition, density, pressure and gas temperature, air inlet flow in load, temperature of sampled firewood in more than 70 points around the furnace volume and volume of pyrolignous generated.

All data was generated continuously in real time and simultaneously. The tests have converged to a stabilized process under the following conditions: volumetric yield of 1.3 st of wood for per m³ of charcoal, gravimetric yield of 35%, carbonization time of 3 h, generation of 6.500 m³/h per furnace with an average PCI of 1.700 kJ/m³, possibility of thermal power generation from furnace of 3 MW or equivalent to generating 1 MWe per 1000 tons of coal, producing 150 liters of pyroligneous per cycle, charcoal production with 200 kg/m³ bulk density. These results demonstrate that the industrial Container furnace of charcoal production, or Furnace Container Rima (FCR) consists of a pioneer industrial technology in charcoal cogeneration and thermal power capable of generating electricity technically and economically viable way.

The development of this project enabled the mass and energy balance detailing in the FCR, whose values show that in this furnace there is excess of oxygen; the combustion occurs with all products derived from the process (gas, tar, pyroligneous and coal). And in addition to the combustion reaction, it was verified that occur important intermediate reactions, such as carbon exothermic reaction with water vapor, gasification and cracking. These intermediate reactions which occur in the furnace, with an operational exclusivity that is being requested in this application, are responsible for an innovative result in the state of the art of carbonization technology. That is, only in the structural, operational, thermal and mechanical conditions of this project, it is possible to produce coal with a gravimetric yield of 35% while a gravimetric yield of 60% gas is obtained, against traditional values, around 30% for the generation of gas. This means that the furnace has a very significant difference from current carbonization furnaces: the generation or preferential production of gas relative to tar and pyroligneous (the condensable fraction ends up gasifying). This is an essential factor to promote the association of this carbonization project to a Thermoelectric central with simultaneous burning of biomass and gas carbonization. With a fraction of condensable contained in the generated gas transport, displacement, storage and piping become feasible to be conducted to a plenum or a balloon, where it is homogenized, and then to direct combustion in a boiler in order to promote the generation of electricity.

i. The mass and energy balance, resulted in the verification of a highly efficient process. The thermal losses are inferior to 5%. The energy percentage available necessary to maintain or sustain the pyrolysis is 10%. The energy contained in the coal around 60% of the energy present in the wood and in the gases of 25%.

APPLICATION EXAMPLES

Below, it will be shown a series of possible configurations for the invention, which aim illustrate its several uses. And, although it can be exemplified by, it is not limited to the examples that follow.

EXAMPLE 1

The industrial furnace of production of charcoal with capacity for 35 m3 can be loaded by the upper hole with wood cavacos, average granulometry between 100 and 120 mm. The furnace, already with the cover placed and locked, is placed on the carbonization system and locked on the movable support base. The exhauster is then switched on and the ignition on specific points, with ember, starts. The carbonization control by the opening and closing of the holes follows in order to provide energy for the endothermic phase. The process ends in about 3 hours, producing 2400 kg of charcoal with gravimetric yield of 33%.

EXAMPLE 2

The industrial furnace for charcoal production with a capacity of 35 m3 can be loaded by the upper hole with wood small logs, average size of 200 mm. The furnace already with the cover placed and locked, is placed on the carbonization system and locked on the movable support base. The exhauster is then switched on and the ignition on specific points, with ember, starts. The carbonization control by the opening and closing of the orifices follows in order to provide energy for the endothermic phase. The process ends in about 5 hours, producing 2800 kg of charcoal with gravimetric yield of 35%.

The invention claimed is:

1. A sealed, portable industrial furnace for optimizing the concurrent production of charcoal, fuel gas, pyroligneous extract and tar, comprising:
    (a) an upright metallic body for receiving wood or biomass to be processed into charcoal, fuel gas, pyroligneous extract and tar, the upright body having an upper end and a lower end;
    (b) a cover mounted on the upper end of the upright body to close off the upper end of the body;
    (c) a pressure relief system located on the cover to relieve excess pressure generated in the furnace during the operation of the furnace;
    (d) a perforated base structure attached to the lower end of the upright body to extend downwardly from the upright body to define a bottom portion of the base structure opposite the upright body;
    (e) a discharge valve for closing off the bottom portion of the base structure during the production of charcoal, fuel gas, pyroligneous extract and tar from biomass and opening the bottom portion of the base structure to unload the charcoal produced;
    (f) a supporting skirt structure encircling the base structure for supporting the upright body in upright position and defining an expansion chamber for the accumulation of combustion gases generated by the furnace and providing a heating source for the biomass at the lower end of the body;
    (g) a series of inlet openings located along the height of the upright body in communication with the interior of the upright body and in communication with flow control valves receiving combustion air;
    (h) a control system for controlling the volume of combustion air flowing through the flow control valves and into the upright body; and
    (i) temperature monitoring devices located along the height of the upright body, said temperature monitoring devices in communication with the control system.

2. The industrial furnace according to claim 1, wherein the upright body is sized to hold between 35 and 65 m³ of wood or biomass to be processed.

3. The industrial furnace according to claim 1, wherein the interior of the upright body is clad with a refractory coating impermeable to tar and vapors.

4. The industrial furnace according to claim 1, wherein the inlet openings are spaced around the circumference of the upright body.

5. The industrial furnace according to claim 1, wherein air inlet openings are located upwardly at the lower end of the upright body at a first location from between 5% and 78% of the height of the upright body, at a second location from between 18% and 26% of the height of the upright body, at a third location from between 30% and 38% of the height of the upright body, at a fourth location from between 50% and 54% of the height of the upright body, at a fifth location from between 62% and 68% of the height of the upright body, at a sixth location from between 78% and 84% of the height of the upright body, and a seventh location from between 94% and 98% of the height of the upright body.

6. The industrial furnace according to claim 1, wherein the base structure is in the form of a frustum having an upper diameter corresponding to the diameter of the upright body and having a lower diameter that is smaller in diameter than the upper diameter at the intersection of the base structure with the upright body.

7. The industrial furnace according to claim 1, wherein the supporting skirt structure is in the form of a truncated cone having an upper diameter corresponding to the diameter of the upright body and a larger, lower diameter mounted on a base platform structure.

8. The industrial furnace accordance to claim 1, wherein the cover is pivotally attached to the upright body, the cover pivotable between a closed positioned disposed over the upper end of the upright body and an open positioned pivoted away from the upper end of the upright body.

9. The industrial furnace according to claim 1, further comprising a plurality of air injection tubes having an outer end disposed outwardly of the upright body and an inward end extending inwardly into the interior of the upright body toward the center of the upright body, said air injection tubes connectable to a source of air for providing combustion air into the interior of the industrial furnace.

10. The industrial furnace according to claim 1, further comprising a plurality of ignition openings in the upright body through which the wood or biomass loaded into the upright body may be ignited.

11. The industrial furnace according to claim 10, further comprising a source of compression air connectable to the ignition openings.

12. The industrial furnace according to claim 10, wherein the ignition openings are located in the lower end of the upright body.

13. The industrial furnace according to claim 12, wherein the ignition openings are spaced around the perimeter of the upright body.

14. The industrial furnace according to claim 1, further comprising pressure relief valves in flow communication with the supporting skirt structure for relieving over-pressure generated within the interior of the supporting skirt structure.

15. The industrial furnace according to claim 1, further comprising a discharge chute positioned beneath the base of the furnace for directing produced charcoal to a storage location.

16. The industrial furnace according to claim 15, wherein the discharge chute is in the form of a frustum having a larger upper diameter and a smaller lower diameter to funnel the charcoal into a storage container.

17. The industrial furnace according to claim 16, further comprising water spray nozzles for directing cooling water into the storage container.

18. The industrial furnace according to claim 15, further comprising an exhaust duct connectable to the discharge chute distal from the furnace base structure for directing exhaust gases away from the industrial furnace.

19. The industrial furnace according to claim 18, further comprising an exhaust blower for inducing the exhaust gases from the industrial furnace through the exhaust duct and away from the industrial furnace.

20. The industrial furnace according to claim 1, further comprising a load cell positioned beneath the industrial furnace to weigh the contents of the industrial furnace.

* * * * *